(12) United States Patent
Hwang et al.

(10) Patent No.: US 9,780,384 B2
(45) Date of Patent: Oct. 3, 2017

(54) ANODE ON A PRETREATED SUBSTRATE FOR IMPROVING REDOX-STABILITY OF SOLID OXIDE FUEL CELL AND THE FABRICATION METHOD THEREOF

(71) Applicant: Institute of Nuclear Energy Research, Atomic Energy Council, Executive Yuan, Taoyuan (TW)

(72) Inventors: Chang-Sing Hwang, Taoyuan (TW); Chun-Huang Tsai, Taoyuan (TW); Jen-Feng Yu, Taoyuan (TW); Chun-Liang Chang, Taoyuan (TW); Jun-Meng Lin, Taoyuan (TW); Shih-Wei Cheng, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 127 days.

(21) Appl. No.: 14/820,347

(22) Filed: Aug. 6, 2015

(65) Prior Publication Data

US 2015/0349348 A1    Dec. 3, 2015

Related U.S. Application Data

(62) Division of application No. 13/167,121, filed on Jun. 23, 2011, now Pat. No. 9,142,838.

(30) Foreign Application Priority Data

Jul. 23, 2010   (TW) .............................. 099124323 A (51) Int. Cl.
*H01M 4/88* (2006.01)
*H01M 8/1246* (2016.01)
(Continued)

(52) U.S. Cl.
CPC ....... *H01M 4/8878* (2013.01); *H01M 4/8657* (2013.01); *H01M 4/886* (2013.01);
(Continued)

(58) Field of Classification Search
None
See application file for complete search history.

(56) References Cited

U.S. PATENT DOCUMENTS

2010/0098996 A1* 4/2010 Hwang ............... H01M 4/8621
429/454

* cited by examiner

*Primary Examiner* — Ula C Ruddock
*Assistant Examiner* — Tony Chuo
(74) *Attorney, Agent, or Firm* — Locke Lord LLP; Tim Tingkang Xia, Esq.

(57) ABSTRACT

A double-layer anode structure on a pretreated porous metal substrate and a method for fabricating the same, for improving the redox stability and decreasing the anode polarization resistance of a SOFC. The anode structure includes: a porous metal substrate of high gas permeability; a first porous anode functional layer, formed on the porous metal substrate by a high-voltage high-enthalpy Ar—He—$H_2$—$N_2$ atmospheric-pressure plasma spraying process; and a second porous anode functional layer, formed on the first porous anode functional layer by a high-voltage high-enthalpy Ar—He—$H_2$—$N_2$ atmospheric-pressure plasma spraying and hydrogen reduction. The first porous anode functional layer is composed a redox stable perovskite, the second porous anode functional layer is composed of a nanostructured cermet. The first porous anode functional layer is also used to prevent the second porous anode functional layer from being diffused by the composition elements of the porous metal substrate.

12 Claims, 5 Drawing Sheets

(51) Int. Cl.
  *H01M 4/90* (2006.01)
  *H01M 8/0232* (2016.01)
  *H01M 8/0243* (2016.01)
  *H01M 8/0245* (2016.01)
  H01M 8/124 (2016.01)
  H01M 4/86 (2006.01)
(52) U.S. Cl.
  CPC ....... *H01M 4/8817* (2013.01); *H01M 4/9033* (2013.01); *H01M 4/9066* (2013.01); *H01M 8/0232* (2013.01); *H01M 8/0243* (2013.01); *H01M 8/0245* (2013.01); *H01M 8/1246* (2013.01); H01M 2004/8684 (2013.01); H01M 2008/1293 (2013.01); Y02E 60/50 (2013.01); Y02P 70/56 (2015.11)

ANODE ON A PRETREATED SUBSTRATE FOR IMPROVING REDOX-STABILITY OF SOLID OXIDE FUEL CELL AND THE FABRICATION METHOD THEREOF

CROSS-REFERENCE TO RELATED APPLICATION

This non-provisional application is a divisional application of U.S. patent application Ser. No. 13/167,121, filed Jun. 23, 2011, which is allowed now U.S. Pat. No. 9,142, 838, and itself claims priority under 35 U.S.C. §119(a) on Patent Application No. 099124323 filed in Taiwan (R.O.C.) on Jul. 23, 2010, the entire contents of which are hereby incorporated by reference.

TECHNICAL FIELD

The present disclosure relates to an anode structure on a pretreated porous metal supporting substrate for improving the redox stability of a solid oxide fuel cell (SOFC), and more particularly, to a SOFC anode with two anode layers coated on a specially prepared porous metal substrate by using a high-voltage high-enthalpy Ar—He—$H_2$—$N_2$ atmospheric-pressure plasma spraying process.

TECHNICAL BACKGROUND

Recently the solid oxide fuel cell (SOFC) has been a promising means of converting chemical energy into electrical energy by an electro-chemical mechanism. Usually in the conventional SOFC, the Yttria Stabilized Zirconia (YSZ) is used as the electrolyte, the cermet composed of nickel (Ni) and YSZ is used as the anode, and the perovskite composed of $LaMnO_3$ is used as the cathode.

When the SOFC works in a high-temperature environment, the anode fuel, $H_2$, may somehow be suddenly interrupted, such that the air may get into the anode of the fuel cell. Since Ni, the metal catalyst for fuels will be oxidized and have its volume increased and its expansion coefficient changed, the anode of the SOFC tends to be broken into pieces.

Consequently, $La_{0.75}Sr_{0.25}Cr_{0.5}Mn_{0.5}O_3$ (LSCM) has been proposed as another option for the anode material of the SOFC, in which hydrogen ($H_2$) or methane ($CH_4$) can be utilized as the fuel and the redox stability of anode can be improved. However, the catalytic conversion efficiency of LSCM is less than that of Ni, and also LSCM is not a good conductor for oxygen (O) ions. Various anode materials have been developed for the SOFC, such as an anode composed of mixed LSCM and YSZ (LSCM-YSZ) or mixed LSCM and Gd-doped ceria (LSCM-GDC). Furthermore, some metal catalyst, such as palladium (Pd), rhodium (Rh), copper (Cu) or Ni, can be doped into this kind of LSCM-YSZ or LSCM-GDC anode to improve the catalytic ability of the anode. In a prior art disclosed in U.S. Pat. No. 7,504,172, a slurry layer is screen-printed on the YSZ electrolyte layer to form a LSCM anode. Also a layer of $Ce_{0.8}Gd_{0.2}O_2$ (GDC) is added between the YSZ electrolyte layer and the LSCM anode to decrease polarization resistance of the anode. It is in need that the polarization resistances of above mentioned anodes are further reduced with improving the anode redox stabilities of SOFC cells.

Moreover, to increase the anode redox stability of a solid oxide fuel cell, it is disclosed that another nickel oxide (NiO) acting as oxidation barrier layer (Journal of The Electrochemical Society, 153(10), A1929, 2006) is coated on the supporting substrate. The NiO particle in this layer has a size less than the NiO particles in the anode, and is to be reduced to a porous Ni layer when the full cell is in the normal operation conditions. This porous fine Ni layer tends to be re-oxidized (or absorbs the leakage oxygen) more easily, so as to absorb abnormal leak oxygen to improve redox stability of the anode of a solid oxide fuel cell. However, the permeability of fuel gas decreases accordingly.

TECHNICAL SUMMARY

It is one object of the present invention to improve the redox ability of the anode of a solid oxide fuel cell.

It is another object of the present invention to minimize the anode polarization resistance of a solid oxide fuel cell and to improve efficiency of energy conversion from chemical energy of hydrogen to electrical energy.

According to one aspect of the present invention, one embodiment provides an anode for improving the redox stability of an SOFC, the anode comprising: a porous metal substrate of high gas permeability; a first porous anode functional layer, formed on the porous metal substrate by a high-voltage high-enthalpy Ar—He—$H_2$—$N_2$ atmospheric-pressure plasma spraying process; and a second porous anode functional layer, formed on the first porous anode functional layer by a high-voltage high-enthalpy Ar—He—$H_2$—$N_2$ atmospheric-pressure plasma spraying and hydrogen reduction. For example, the material of the first porous anode layer is composed of LSCM, or $Sr_{0.86}Y_{0.08}TiO_3$, or $La_{0.33}Sr_{0.66}TiO_3$ perovskite, and the material of the second porous anode layer after hydrogen reduction is composed of an LDC-Ni cermet mixture, or an LDC-Cu cermet mixture, or a GDC-Ni cermet mixture, or a GDC-Cu cermet mixture, or an LDC-Ni—Cu cermet mixture, or a GDC-Ni—Cu cermet mixture. The combination of the high gas-permeable porous metal supporting substrate, the first porous anode layer, the second porous anode layer promotes the anode function significantly.

According to another aspect of the present invention, another embodiment provides a method for fabricating an anode on a pretreated substrate for improving the redox stability of an SOFC, the method comprising the steps of: providing a porous metal substrate, a first powder of redox stable perovskite material, and a second powder of oxide mixture capable of conducting both electron and oxygen ion after converted to a cermet mixture by hydrogen reduction; sieving the first and second powders into groups according to the sizes thereof; applying a pre-treatment process to the porous metal substrate to improve the gas-permeable porosity and mechanic strength thereof; forming a first anode functional layer of the first powder on the pre-treated porous metal substrate by using a high-voltage high-enthalpy Ar—He—$H_2$—$N_2$ atmospheric-pressure plasma spraying; and forming a second anode functional layer of the second powder on the first anode functional layer by a high-voltage high-enthalpy Ar—He—$H_2$—$N_2$ atmospheric-pressure plasma spraying and hydrogen reduction. The pre-treatment process to form a high gas permeable porous metal substrate may comprise the steps of: eroding the porous metal substrate in an acid; impregnating the porous metal substrate with an Fe-contained material by a vacuum means, and then sintering the porous metal substrate in a high-temperature reduced or vacuum atmosphere, until the amount of Fe in the porous metal substrate reaches about 6 wt % to 15 wt %; forming a first porous surface layer of nickel powder on the porous metal substrate and a second porous surface layer of nickel-YSZ powder on the first porous surface layer; sintering the porous metal substrate in a high-temperature reduced or vacuum atmosphere, until gas-permeability of the porous metal substrate is 2 to 5 Darcy and surface pores on the porous metal substrate is less than 50 μm; and oxidizing surface of the porous metal substrate so as to reduce the sizes of surface pores further to less than 30 μm.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following.

Figure 1A:
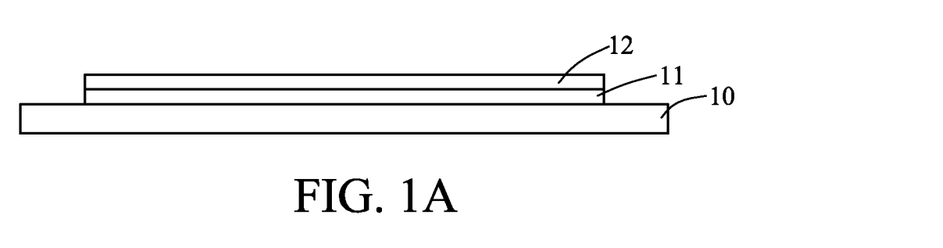
FIG. 1A is a schematic diagram showing the architecture of a double-layer anode on a pretreated porous metal supporting substrate for a SOFC according to an embodiment of the present disclosure.
Figure 1B:
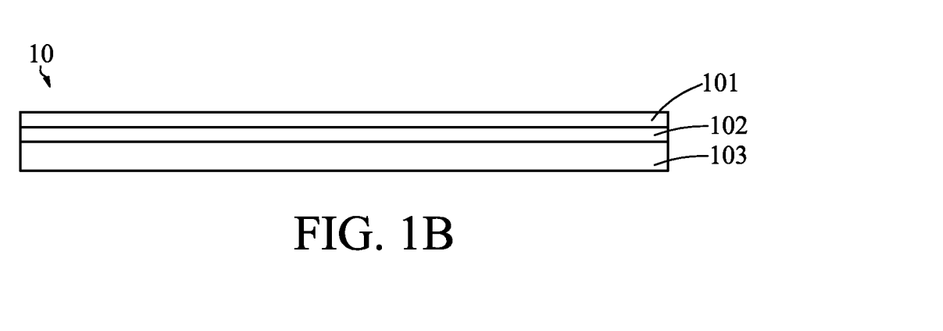
FIG. 1B is a schematic diagram of a pretreated porous metal supporting substrate.

Please refer to FIG. 1A, which is a schematic diagram showing the architecture of a double-layer anode on a porous metal supporting substrate for a SOFC according to an embodiment of the present disclosure. The double-layer anode structure 1 after hydrogen reduction is composed of a supporting substrate 10, a first porous anode layer 11, and a second porous anode layer 12. The supporting substrate 10 is a pretreated porous metal substrate of high gas permeability. As shown in FIG. 1B, the supporting substrate 10 is composed of a first porous surface film 101, a second porous surface film 102, and a porous metal plate 103.

After hydrogen reduction, the porous metal plate 103 is mainly composed of Ni and Fe, the first porous surface film 101 is mainly composed of Ni particles and the second porous surface film 102 is mainly composed of mixed Ni and YSZ particles. The first porous anode layer 11 is coated on the supporting substrate 10 and is composed of a perovskite structure material capable of conducting electrons mainly. In the embodiment, $La_{0.75}Sr_{0.25}Cr_{0.5}Mn_{0.5}O_3$ (LSCM) is used as the perovskite material wherein Cr:Mn=0.5:0.5, but is not limited thereby, which can be 0.4:0.6, 0.6:0.4, or the other ratio value, or $Sr_{0.86}Y_{0.08}TiO_3$ or $La_{0.33}Sr_{0.66}TiO_3$. The sizes of the perovskite powders are about 400 nm to 10 μm. Regarding the first porous anode layer 11, the thickness thereof is about 10 μm to 30 μm, most of the pores therein have sizes of less than 30 μm, and the porosity is about 15% to 30%.

The second porous anode layer 12 is coated on the first porous anode layer 11 and the anode layer 12 after hydrogen is a cermet material capable of conducting both electrons and oxygen ions. The powders used to form this cermet anode layer can be submicron or nano powders. In the embodiment, the powders of La-doped ceria (LDC) and NiO mixture (LDC-NiO) are applied to form a layer and after hydrogen reduction the LDC-Ni cermet anode layer 12 is formed, wherein the volume ratio of LDC to Ni can be as large as 1:1, but is not limited thereby, and the particle size of the LDC or Ni is less than 100 nm. Regarding the formed second porous anode layer 12, the thickness thereof is about 10 to 30 μm, the average pore size is less than 100 nm so as to increase the three-phase-boundary (TPB) quantity, and the porosity is about 12 to 30%. Also, the cermet composite material can be LDC-Ni cermet mixture, LDC-Cu cermet mixture, Gd-doped ceria (GDC)-Ni cermet mixture, GDC-Cu cermet mixture, LDC-Ni—Cu cermet mixture, or GDC-Ni—Cu cermet mixture.

Figure 2A:
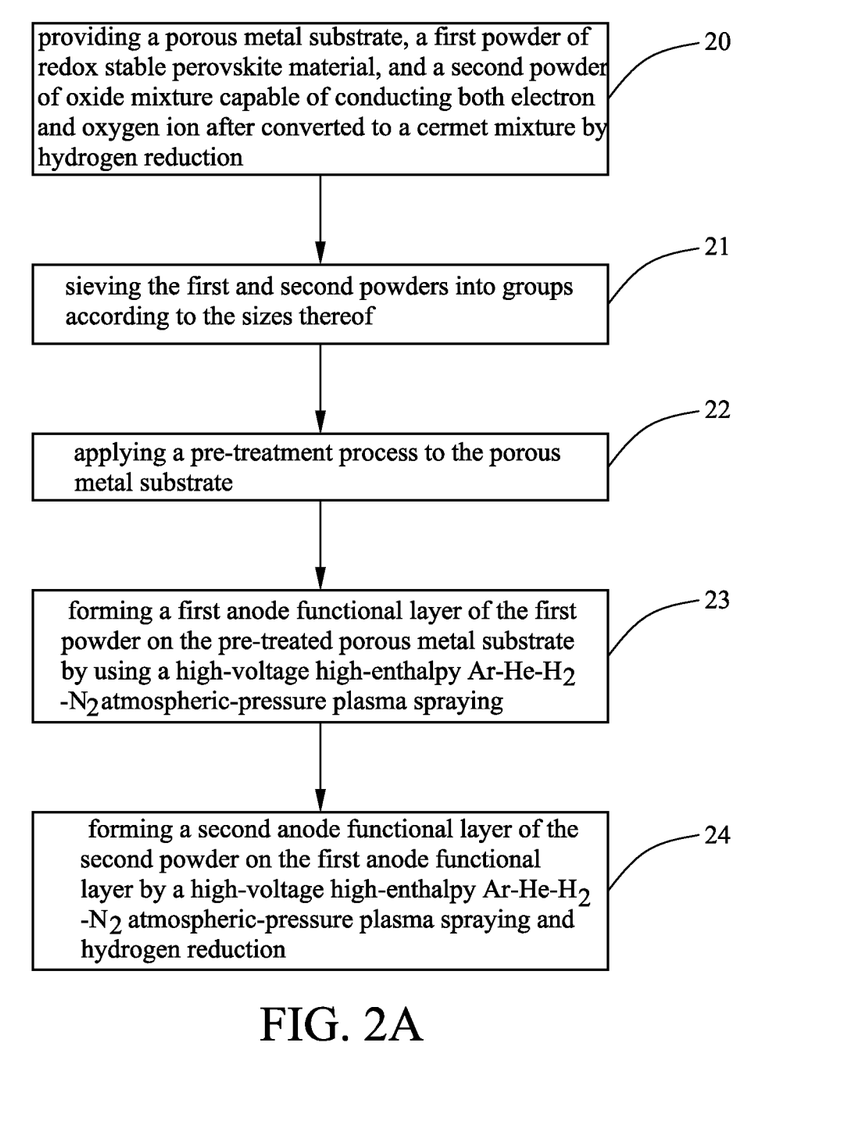
FIG. 2A is a flowchart of a fabricating method of the double-layer anode on a pretreated porous metal supporting substrate, according to another embodiment of the present disclosure.
Figure 2B:
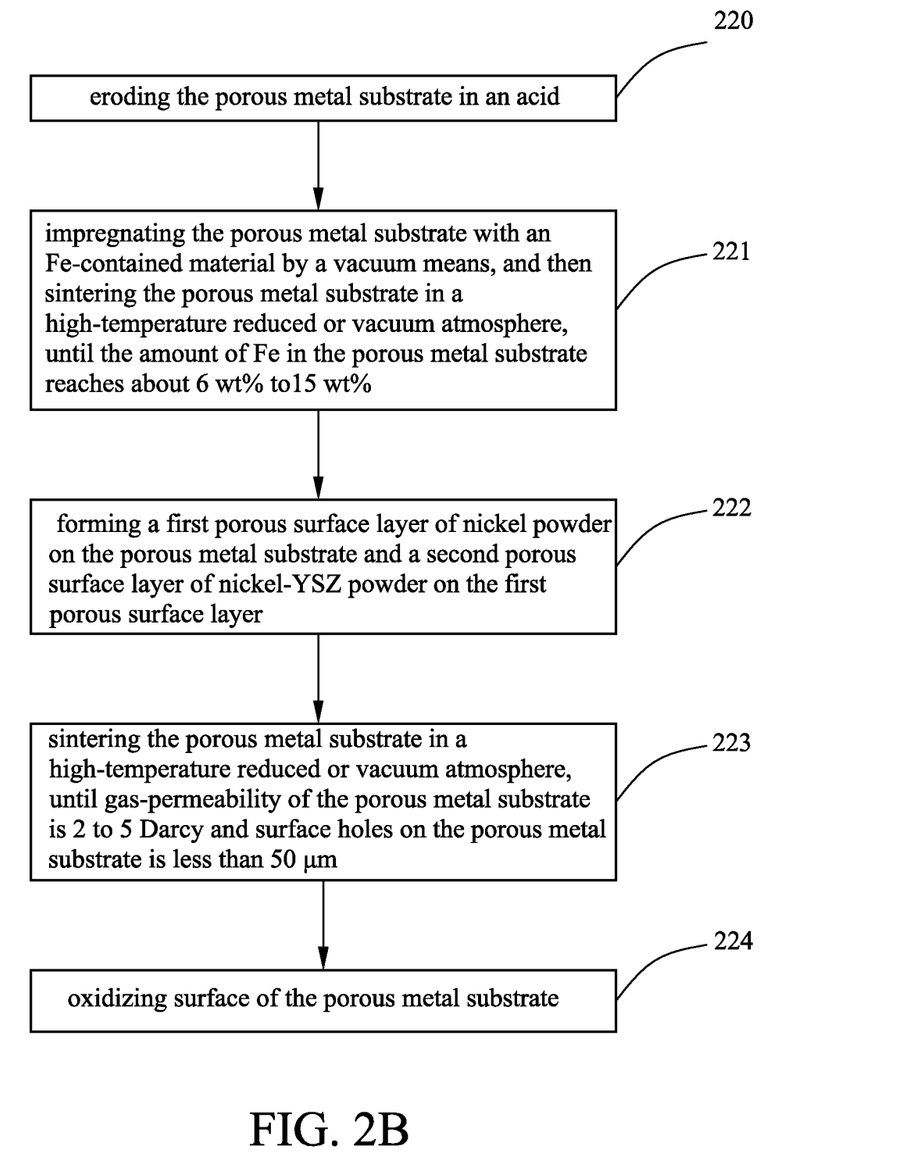
FIG. 2B is a flowchart of the pre-treatment process for forming a porous metal supporting substrate in the embodiment.

Referring to FIG. 2A, a flowchart of fabricating a redox-stable anode on a pretreated porous metal supporting substrate for a SOFC is schematically shown according to another embodiment of the present disclosure. In Step 20, a porous metal substrate, a first powder of redox stable perovskite material, and a second powder of oxide mixture converting to a cermet material after hydrogen reduction are provided. The porous metal substrate is mainly composed of Ni and has a thickness of from 1.05 mm to 1.25 mm. The perovskite is mainly capable of conducting electrons and the cermet materials are capable of conducting both electrons and oxygen ions. Then in Step 21, the first and second powders, for example, LSCM and nanostructured LDC-NiO powders, respectively, either in agglomerated form or sintered and crushed form, are sieved into groups of 10-20 μm, 20-40 μm, and 40-70 μm, according to their particle sizes. Then in Step 22, a pre-treatment process is applied to the porous metal substrate to provide a high gas-permeable porous metal substrate with enhanced strength for supporting a SOFC. After Step 22 that involves detailed steps as shown in FIG. 2B and hydrogen reduction, the porous metal substrate have porous shells containing fine Fe and Ni particles on the particle surfaces of the porous metal substrate. The hydrogen reduction can also occur in the normal operation of a SOFC. The porous shells are capable of absorbing the leakage oxygen by oxidation. Then in Step 23, a first anode functional layer is formed of the first powder (LSCM in this example) on the prepared porous substrate by using a high-voltage high-enthalpy Ar—He—$H_2$—$N_2$ atmospheric-pressure plasma spraying process. Then in Step 24, a second anode functional layer of the second powder (nano LDC-NiO in the example) on the first anode functional layer by a high-voltage high-enthalpy Ar—He—$H_2$—$N_2$ atmospheric-pressure plasma spraying process. After hydrogen reduction, this LDC-NiO layer changes to be the LDC-Ni layer named as the second anode functional layer. The powders used in the high-voltage high-enthalpy Ar—He—$H_2$—$N_2$ atmospheric-pressure plasma spraying process can be selected from one of the three groups mentioned in the Step 21. The high-voltage high-enthalpy Ar—He—$H_2$—$N_2$ atmospheric-pressure plasma spraying technique is characterized by high voltage and medium current, which are advantageous to reduce the erosion rate of electrodes of a plasma spray gun, so as to increase the lifetime of the plasma spray gun and the efficiency of being heated for the powder due to longer arc length.

With regard to the pre-treatment process in Step 22, FIG. 2B shows a flowchart of this process in the embodiment. In Step 220, the porous metal substrate containing nickel is eroded in 5% $HNO_3$ so that its weight is decreased by 10%. Then in Step 221, the eroded porous nickel metal substrate is impregnated with a Fe-contained material such as $Fe(NO_3)_3.9H_2O$ in water or $Fe_3O_4$ particles less than 2 μm in ethanol by using a vacuum means, then the impregnated porous nickel metal plate is sintered in a high-temperature (1150° C. to 1350° C.) reduced or vacuum atmosphere. Repeating the foregoing step 221 till the Fe content in the porous metal plate reaches about 6 wt % to 15 wt %. After high-temperature (1150° C. to 1350° C. reduced or vacuum atmosphere sintering process, the added Fe interacts with nickel to form a Ni—Fe alloy. Then in Step 222, a first and a second porous surface films are formed on the porous metal plate by a powder-covering method or a screen printing method, the used powders for forming the first and second porous surface films 101 and 102 are respectively nickel and mixed Ni and YSZ (nickel-YSZ). The first porous surface film 101 has a thickness in the range of 10 to 40 μm, the second porous surface film 102 has a thickness in the range of 30 to 60 μm and the YSZ powders in the second porous surface film 102 can be nano, or submicron or micron grade. The nickel content in the second porous surface film 102 is from 40 wt % and 60 wt %. Then in Step 223, the applied powders or slurries containing powders on the porous metal substrate are then sintered in a high-temperature (1250° C. to 1400° C.) reduced or vacuum atmosphere to form a prepared porous substrate for supporting a SOFC. To erode the prepared porous substrate till the gas permeability of this porous substrate is 2 to 5 Darcy ($1.974 \times 10^{-12}$ $m^2$ to $4.935 \times 10^{-12}$ $m^2$,) but surface pores of the first porous surface film 101 is less than 50 μm. The thickness of the first porous surface film 101 is in a range of 10 to 40 μm and the thickness of the second porous surface film 102 is in a range of 30 to 60 μm. Then in Step 224, the prepared porous substrate after finishing Step 223 are oxidized in a furnace at a temperature of 600° C. to 800° C. for 1 to 2 hours to reduce the sizes of surface pores further to less than 30 μm. After the pre-treatment as shown in FIG. 2B, the prepared porous substrate has a thickness less than 1.35 mm.

Figure 2C:
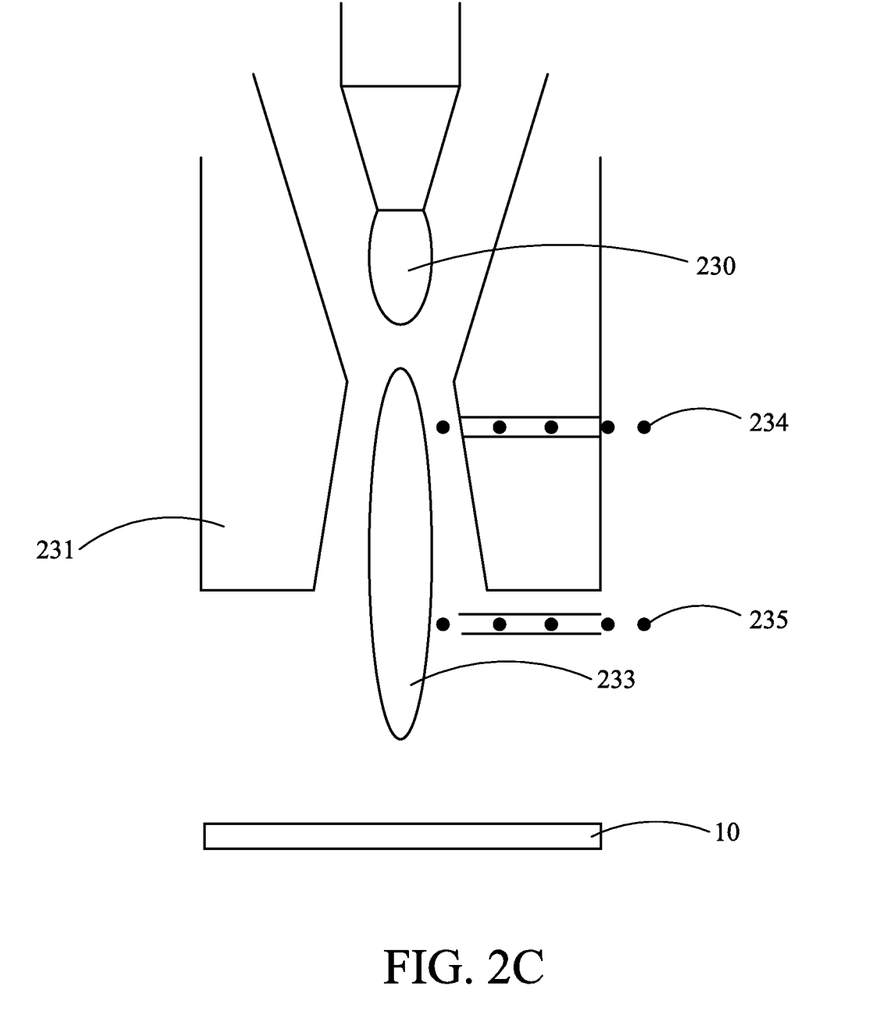
FIG. 2C is a schematic architecture of the high-voltage high-enthalpy Ar—He—$H_2$—$N_2$ atmospheric-pressure plasma spraying and the powder-injected plasma jet techniques.

The foregoing high-voltage high-enthalpy Ar—He—$H_2$—$N_2$ atmospheric-pressure plasma spraying can be schematically illustrated in FIG. 2C. Ar, He, $H_2$ and $N_2$ gases are homogeneously mixed to facilitate the generation of high voltage high-enthalpy atmospheric-pressure plasma, wherein the flow rates of Ar, He, $H_2$ and $N_2$ are usually 49-56 slpm, 23-27 slpm, 2-8 slpm and 5-10 slpm, respectively. The flow rate of each gas is controlled by the individual mass flow meter. The average operating voltage in plasma spraying is about 100 to 112 V with a variation within 1 V and the torch current is in the range of 330 to 400 A.

Firstly, the Ar gas is introduced into the space between the cathode 230 and anode 231 of the plasma spray gun, where a starter is used to excite an electric arc and generate Ar plasma. Then the gas flows 232 of Ar, He, $H_2$ and $N_2$ gases are introduced therein and raised to needed levels to generate a high-temperature plasma jet 233. Depending on the ability of the sprayed material to resist hydrogen reduction, the ratio of $H_2$ to $N_2$ is adjusted to get the right phase of plasma sprayed layer and to minimize the impurity phase in the plasma sprayed layer. One of the grouped powders of LSCM or nanostructured LDC-NiO in the Step 21 is injected in the high-temperature plasma jet 233 internally 234 or externally 235. The high-temperature plasma jet 233 heats and accelerates the LSCM or nanostructured LDC-NiO powders with or without carbon pore former to strike the pre-heated prepared porous substrate at a temperature of about 450° C. to 700° C. and form the first 11 and the second 12 porous anode functional layers thereon. The content of carbon pore former is less than 15 wt %.

Figure 3:
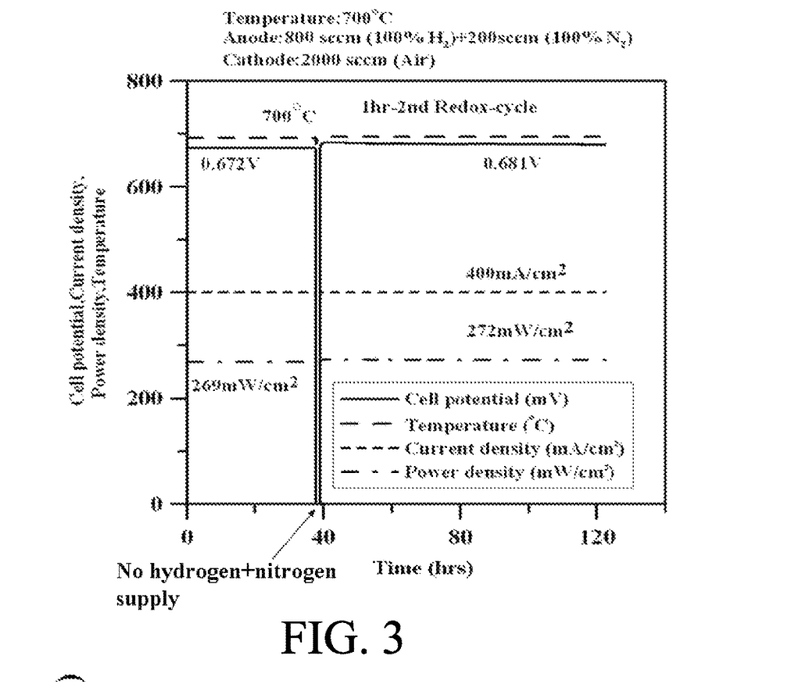
FIG. 3 illustrates the redox stability of the double-layer anode of the tested cell.
Figure 4:
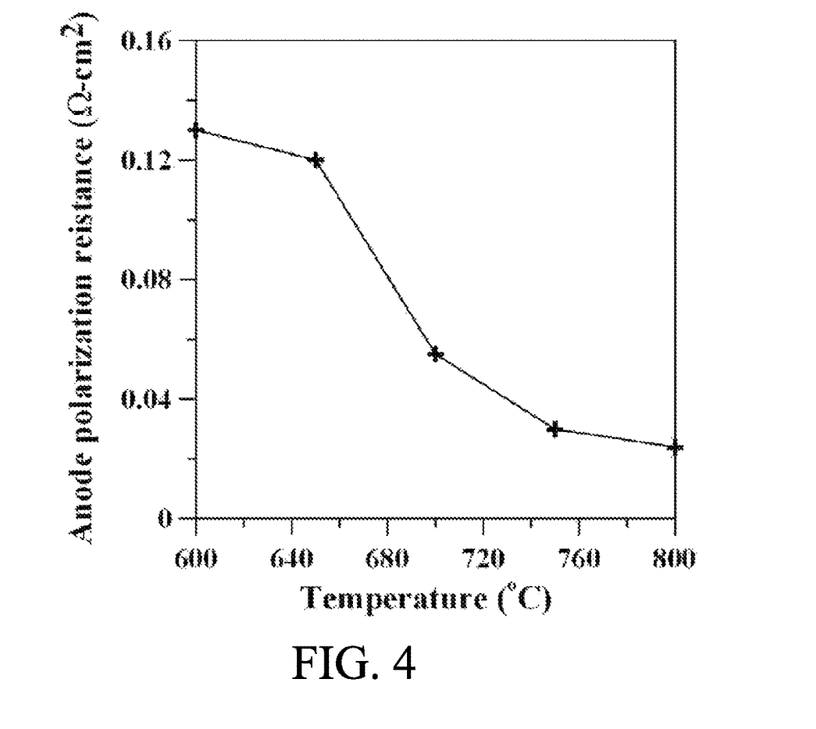
FIG. 4 shows the measured anode polarization impedances versus temperatures by AC impedance spectroscopy.

FIG. 3 illustrates the redox stability of this double-layer anode LSCM/LDC-Ni on the pretreated porous Ni—Fe substrate. The SOFC cell based on the invented anode has the Ni—Fe/LSCM/LDC-Ni/LDC/LSGM/LSGM-LSCF/LSCF material structure. Ni and Fe are mainly used to form a prepared porous substrate, LSCM and nanostructured LDC-Ni anode functional layers are coated on the prepared porous substrate, LDC and LSGM are used as an interlayer and an electrolyte layer, and LSCF is used as cathode. At the time about 40 hr as shown in FIG. 3, the hydrogen and nitrogen gases are stopped supplying for about two hours, during this time interval the air can flow into the SOFC anode freely. Because of no supplied fuel gas in the anode, the voltage of the tested cell drops to zero. After supplying the hydrogen and nitrogen gases again, the cell voltage rises and appears to be stable at 0.681 V which is larger than 0.672 V before stopping supplying the hydrogen and nitrogen gases. This shows the invented double-layer anode has the redox stability. FIG. 4 shows the measured polarization impedances versus temperatures from 600 to 800° C. by AC impedance spectroscopy, the measured polarization resistances of the double-layer anode in this temperature range varies from 0.025 $\Omega cm^2$ (800° C.) to 0.13 $\Omega cm^2$ (600° C.) that are smaller than the values of previously disclosed redox stable anodes.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for fabricating an anode on a pretreated substrate for improving the redox stability of a solid oxide fuel cell (SOFC), the method comprising the steps of:
    providing a porous metal substrate formed of metal particles, a first powder of redox stable perovskite material, and a second powder of oxide mixture capable of conducting both electron and oxygen ion after being converted to a cermet mixture by hydrogen reduction;
    sieving the first and second powders into groups according to sizes of particles of the first powder and sizes of particles of the second powder;
    applying a pre-treatment process to the porous metal substrate to improve the gas-permeable porosity of the porous metal substrate and mechanic strength of the porous metal substrate for supporting the SOFC;
    forming porous shells on surfaces of metal particles of the pre-treated porous metal substrate, the porous shells contain fine Fe and Ni particles by hydrogen reduction;

forming a first anode functional layer of the first powder on the pre-treated porous metal substrate by using a high-voltage high-enthalpy Ar—He—H$_2$—N$_2$ atmospheric-pressure plasma spraying; and forming a second anode functional layer of the second powder on the first anode functional layer by a high-voltage high-enthalpy Ar—He—H$_2$—N$_2$ atmospheric-pressure plasma spraying and hydrogen reduction.

2. The method of claim 1, wherein the first and second powders are in an agglomerated form or in a sintered and crushed form.

3. The method of claim 1, wherein the groups comprise 10-20 μm, 20-40 μm, and 40-70 μm, according to particle sizes of the first and second powders.

4. The method of claim 1, wherein the pre-treatment process comprises the steps of:
(a) eroding the porous metal substrate in an acid;
(b) impregnating the porous metal substrate with an Fe-contained material by a vacuum means, and then sintering the porous metal substrate in a high-temperature reduced or vacuum atmosphere, until an amount of Fe in the porous metal substrate reaches about 6 wt % to 15 wt %;
(c) forming a first porous surface layer of nickel powder on the porous metal substrate and a second porous surface layer of nickel-YSZ powder on the first porous surface layer;
(d) sintering the porous metal substrate in a high-temperature reduced or vacuum atmosphere, until gas-permeability of the porous metal substrate is 2 to 5 Darcy ($1.974 \times 10^{-12}$ m$^2$ to $4.935 \times 10^{-12}$ m$^2$) and surface pores on the porous metal substrate is less than 50 μm; and
(e) oxidizing surface of the porous metal substrate so as to reduce sizes of surface pores further.

5. The method of claim 4, wherein the acid comprises a diluted acid.

6. The method of claim 4, wherein the porous metal substrate is mainly composed of Ni.

7. The method of claim 4, wherein the Fe-contained material is in a solution form or in a particle form of less than 2 μm immersed in ethanol.

8. The method of claim 4, wherein the first and second porous surface layers are formed by powder-covering method or screen printing method, and the second porous surface layer has a thickness in a range from 30 to 60 μm, the first porous surface layer has a thickness in a range from 10 to 40 μm.

9. The method of claim 4, wherein sintering in step (b) is performed at a temperature in a range between 1250° C. and 1400° C., and sintering in step (d) is performed at a temperature in a range between 1150° C. and 1350° C.

10. The method of claim 4, wherein oxidizing in step (e) is performed at a temperature in a range between 600° C. and 800° C. for 1 to 2 hours to reduce the sizes of surface pores to less than 30 μm.

11. The method of claim 1, wherein the high-voltage high-enthalpy Ar—He—H$_2$—N$_2$ atmospheric-pressure plasma spraying process involves Ar, He, H$_2$ and N$_2$ gases with adjustable composition percentages of Ar, He, H$_2$ and N$_2$ gases.

12. The method of claim 1, wherein the high-voltage high-enthalpy Ar—He—H$_2$—N$_2$ atmospheric-pressure plasma spraying process uses mass flow meters to control the flow rate of each gas and adjust composition percentages of Ar, He, H$_2$ and N$_2$ gases.

* * * * *